United States Patent
Watts

(10) Patent No.: US 10,137,352 B1
(45) Date of Patent: Nov. 27, 2018

(54) GOLF PUTTING TRAINING DEVICE

(71) Applicant: Darryal Watts, Charlotte, NC (US)

(72) Inventor: Darryal Watts, Charlotte, NC (US)

( * ) Notice: Subject to any disclaimer, the term of this patent is extended or adjusted under 35 U.S.C. 154(b) by 0 days.

(21) Appl. No.: 15/604,067

(22) Filed: May 24, 2017

(51) Int. Cl.
*A63B 69/36* (2006.01)
*G09B 19/00* (2006.01)
*A63B 102/32* (2015.01)
*A63B 71/06* (2006.01)

(52) U.S. Cl.
CPC ...... *A63B 69/3676* (2013.01); *A63B 69/3667* (2013.01); *G09B 19/0038* (2013.01); *A63B 69/36* (2013.01); *A63B 2071/0625* (2013.01); *A63B 2071/0655* (2013.01); *A63B 2102/32* (2015.10); *A63B 2220/80* (2013.01); *A63B 2225/093* (2013.01)

(58) Field of Classification Search
CPC ............ A63B 69/3667; A63B 69/3682; A63B 69/3676; A63B 69/3679; A63B 69/36
USPC ........ 473/266, 267, 271, 273, 276, 277, 278
See application file for complete search history.

(56) References Cited

U.S. PATENT DOCUMENTS

| | | | | |
|---|---|---|---|---|
| 2,611,610 A * | 9/1952 | Hara | ................... | A63B 69/0059 473/257 |
| 4,998,791 A | 3/1991 | Bowen | | |
| 5,102,142 A | 4/1992 | Bittl | | |
| D336,121 S | 6/1993 | Bellagamba | | |
| 5,616,085 A * | 4/1997 | LaCoste, Jr. | ........ | A63B 69/3667 473/267 |
| 5,913,732 A * | 6/1999 | Kwakkel | ............ | A63B 69/3676 473/240 |
| 6,048,273 A * | 4/2000 | Clement | ............ | A63B 69/3676 273/DIG. 21 |
| 6,343,998 B1 * | 2/2002 | Tarulli | ............... | A63B 69/0057 473/273 |
| 6,371,863 B1 * | 4/2002 | Moran | ............... | A63B 69/3644 473/207 |
| 6,575,844 B1 * | 6/2003 | Gray | .................. | A63B 69/3608 473/273 |
| 6,595,865 B2 | 7/2003 | Stitz | | |
| 6,755,751 B2 | 6/2004 | Chapman | | |
| 6,988,957 B2 * | 1/2006 | Bender | ............. | A63B 69/0057 473/266 |
| 7,150,683 B2 | 12/2006 | Bender | | |
| 7,204,766 B1 * | 4/2007 | Rose | .................. | A63B 69/0059 473/266 |
| 8,088,018 B2 | 1/2012 | Melville et al. | | |

(Continued)

FOREIGN PATENT DOCUMENTS

WO    WO2009153538    12/2009

*Primary Examiner* — Benjamin Layno

(57) ABSTRACT

A golf putting training device for developing a proper putting stroke includes a base that is configured to position on a substantially horizontal surface. A post is coupled to and extends perpendicularly from the base. The post comprises a plurality of nested sections and is selectively extensible. A line guide is coupled to a front of the base. A frame is coupled to the post distal from the base. The frame extends from the post toward the front of the base. The frame is open-bottomed and is configured to bracket both shoulders of a user who is positioned between the post and the front of the base. The line guide is configured to direct a swing of a putter that is positioned in hands of the user. The frame is configured to contact a torso of the user to notify the user of an improper putting stroke.

15 Claims, 6 Drawing Sheets

(56) References Cited

U.S. PATENT DOCUMENTS

Figure 1:
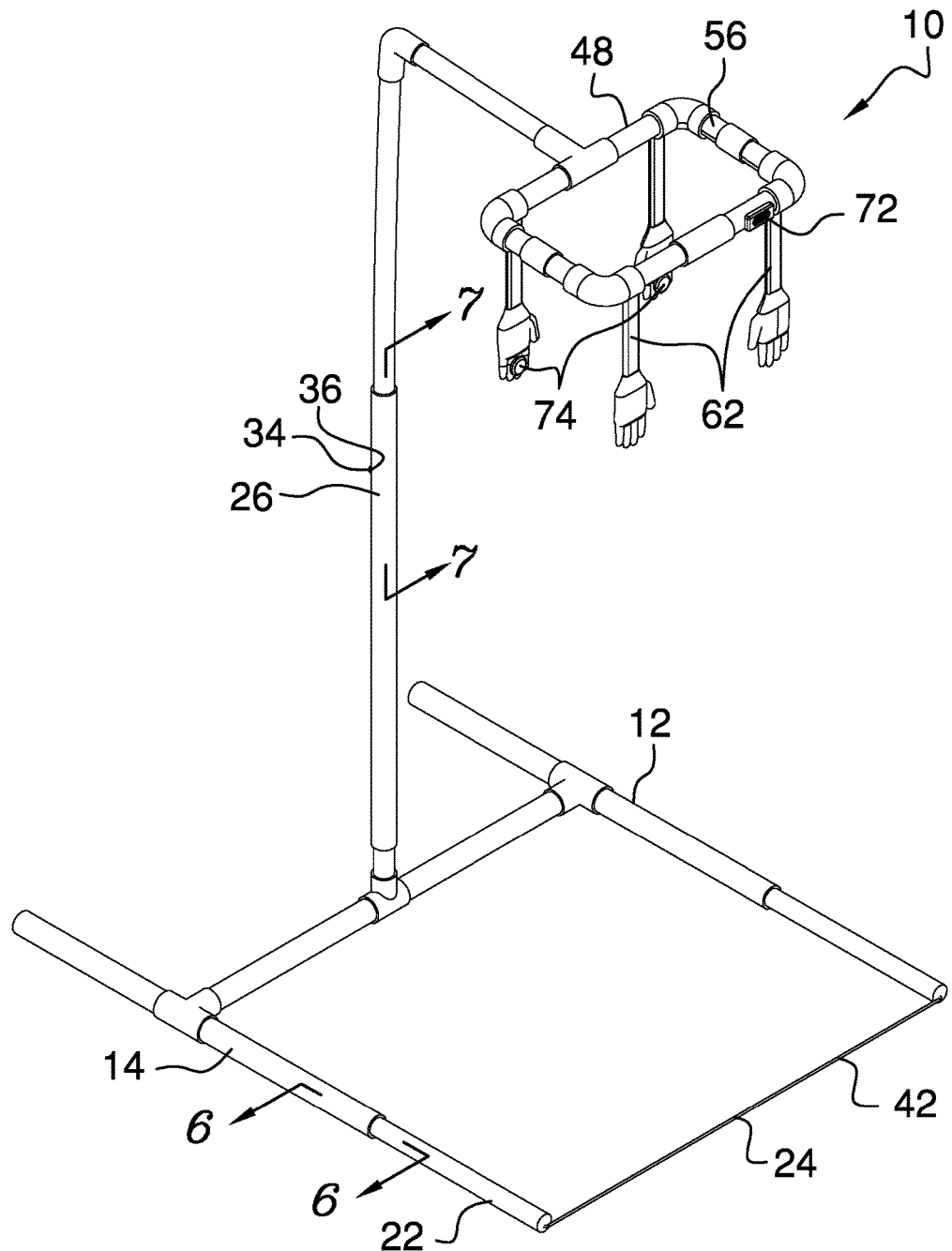

| | | |
|---|---|---|
| 8,425,343 B1 | 4/2013 | Olmos |
| 8,784,229 B1 * | 7/2014 | McCullough ...... A63B 69/0057 473/257 |
| 9,561,421 B2 * | 2/2017 | Hungelmann ..... A63B 69/0057 |
| 9,861,873 B1 * | 1/2018 | Davis ................. A63B 69/3644 |
| 2011/0118085 A1 * | 5/2011 | Douglas ............. A63B 21/0087 482/5 |

* cited by examiner

US 10,137,352 B1

GOLF PUTTING TRAINING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to training devices and more particularly pertains to a new training device for developing a proper putting stroke.

BRIEF SUMMARY OF THE INVENTION

An embodiment of the disclosure meets the needs presented above by generally comprising a base that is configured to position on a substantially horizontal surface. A post is coupled to and extends perpendicularly from the base. The post comprises a plurality of nested sections and is selectively extensible. A line guide is coupled to a front of the base. A frame is coupled to the post distal from the base. The frame extends from the post toward the front of the base. The frame is open-bottomed and is configured to bracket both shoulders of a user who is positioned between the post and the front of the base. The line guide is configured to direct a swing of a putter that is positioned in hands of the user. The frame is configured to contact a torso of the user to notify the user of an improper putting stroke.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is an isometric perspective view of a golf putting training device according to an embodiment of the disclosure.

Figure 2:
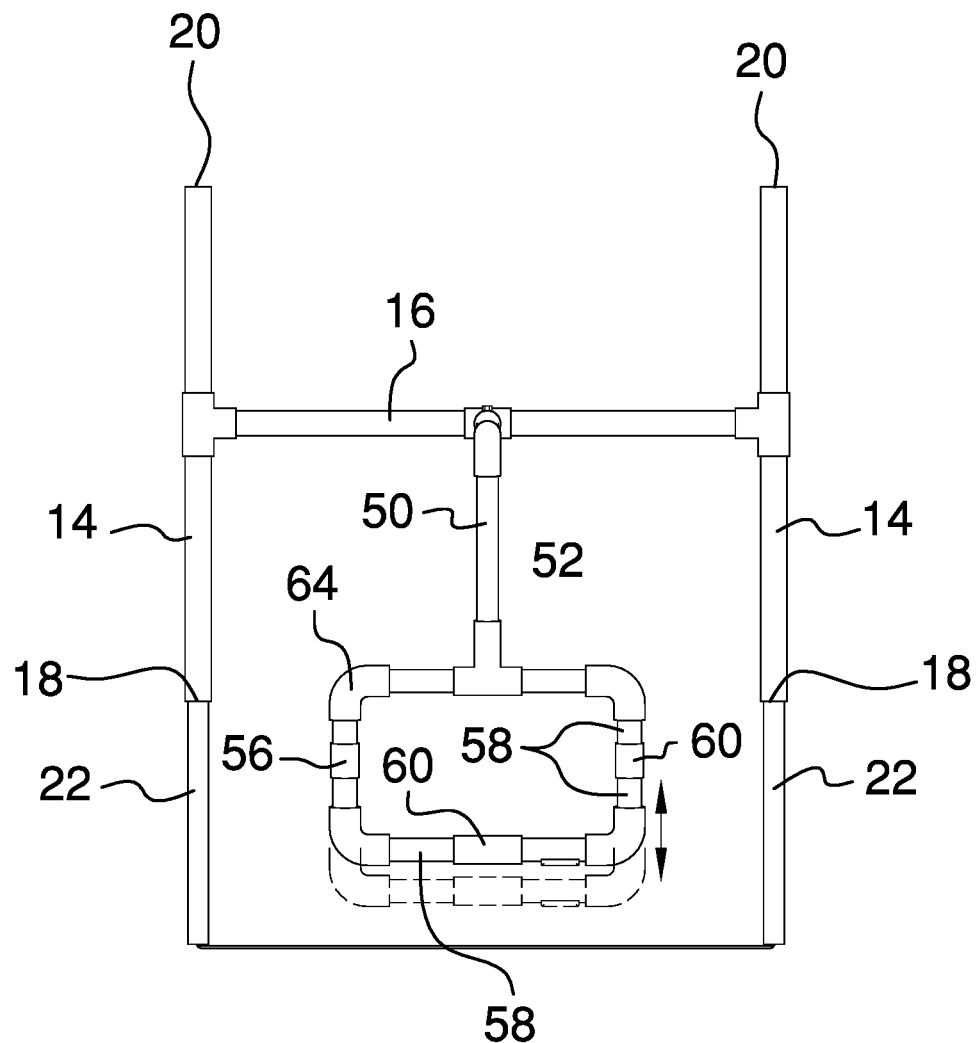
Figure 3:
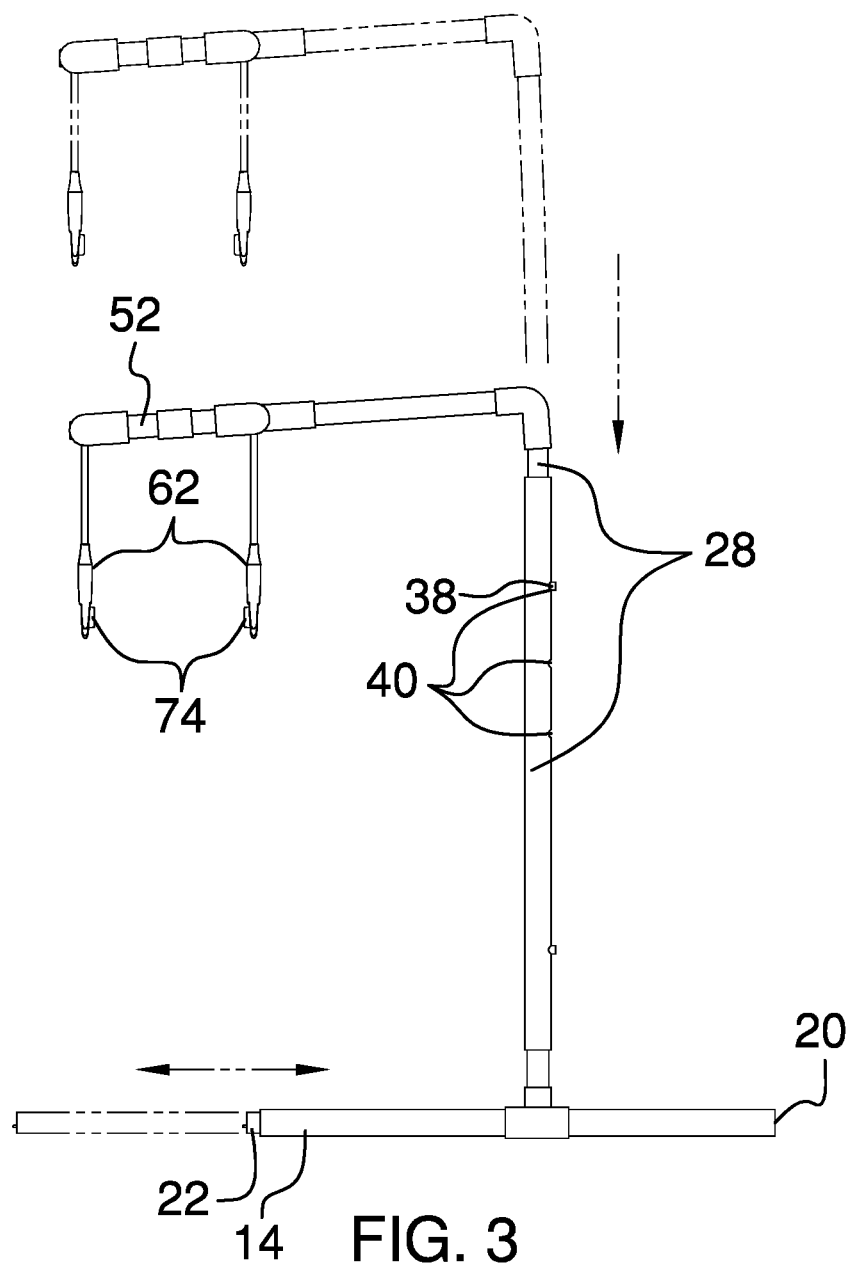
Figure 4:
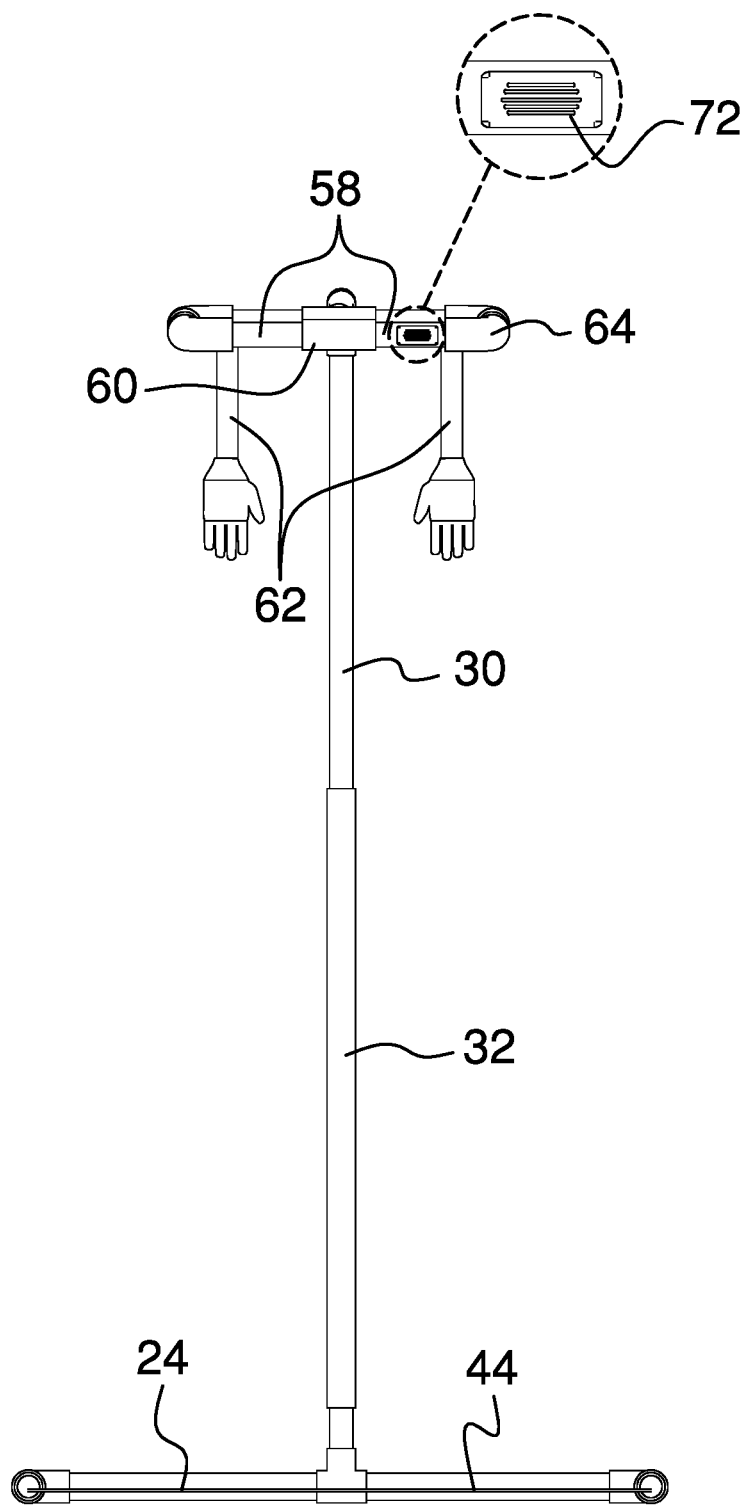
Figure 5:
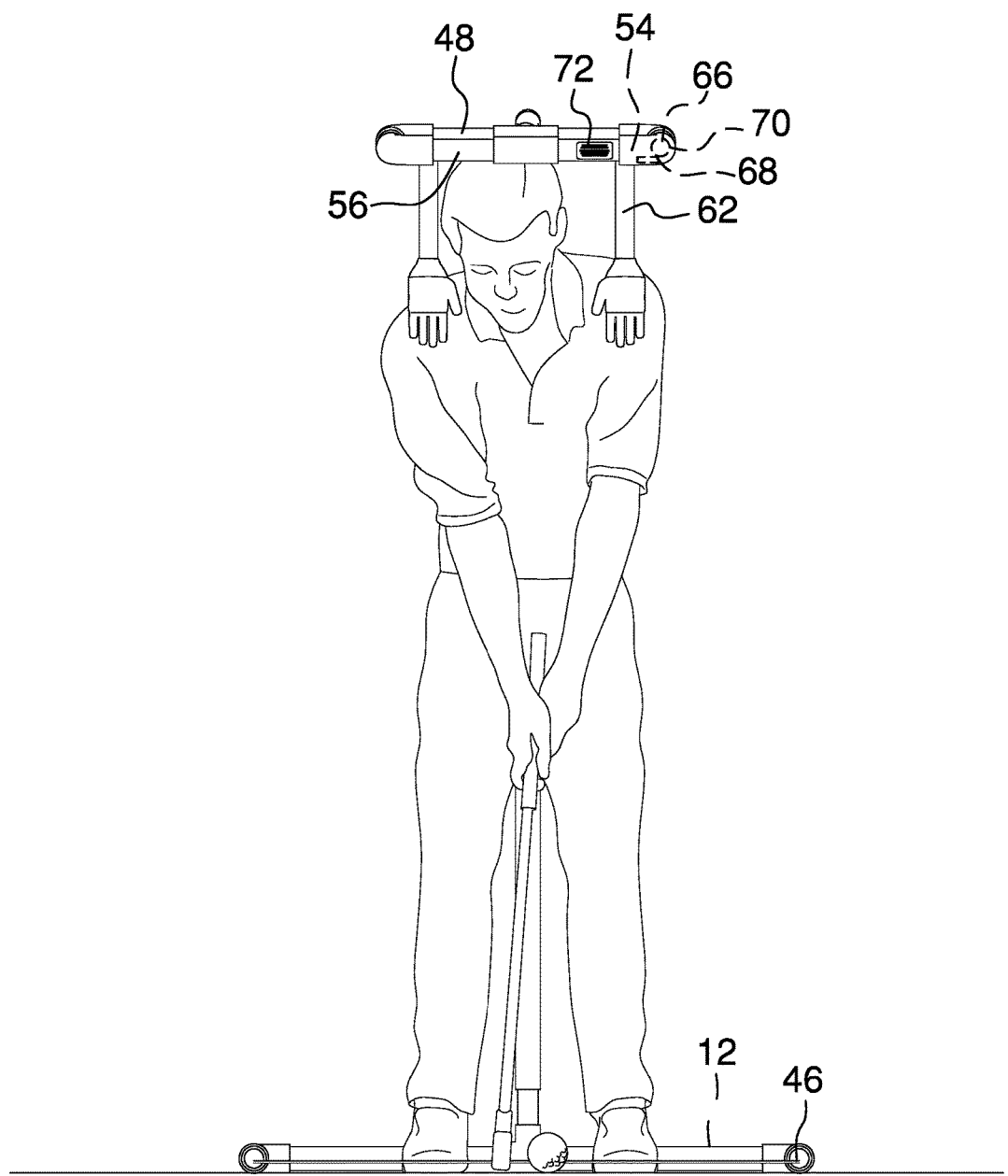
Figure 6:
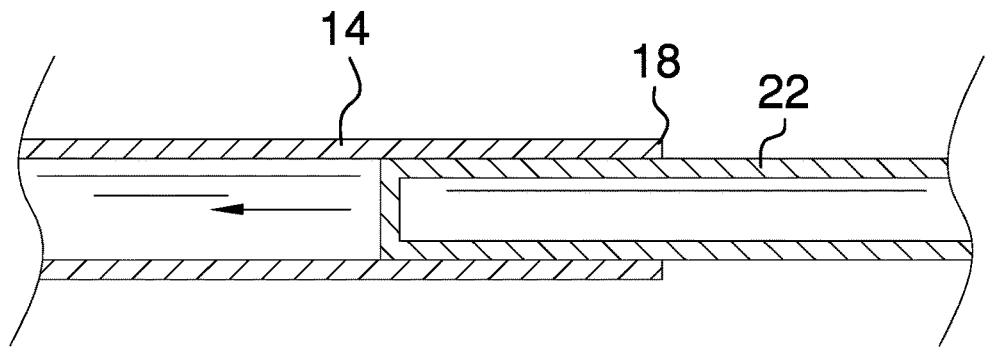
Figure 7:
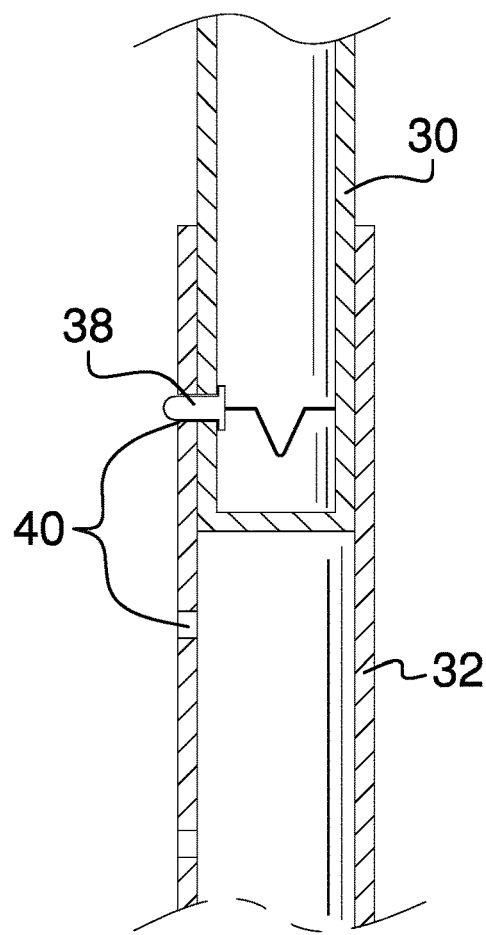

FIG. 2 is a top view of an embodiment of the disclosure.
FIG. 3 is a side view of an embodiment of the disclosure.
FIG. 4 is a front view of an embodiment of the disclosure.
FIG. 5 is an in-use view of an embodiment of the disclosure.
FIG. 6 is a cross-sectional view of an embodiment of the disclosure.
FIG. 7 is a cross-sectional view of an embodiment of the disclosure.

DETAILED DESCRIPTION OF THE INVENTION

With reference now to the drawings, and in particular to FIGS. 1 through 7 thereof, a new training device embodying the principles and concepts of an embodiment of the disclosure and generally designated by the reference numeral 10 will be described.

As best illustrated in FIGS. 1 through 7, the golf putting training device 10 generally comprises a base 12 that is configured to position on a substantially horizontal surface. In one embodiment, the base 12 comprises a pair of first tubes 14 and a second tube 16. The second tube 16 is coupled to and extends perpendicularly between the first tubes 14. The second tube 16 is positioned substantially equally distant from a first end 18 and a second end 20 of each first tube 14. In another embodiment, the first tubes 14 and the second tube 16 are substantially circularly shaped when viewed longitudinally. In yet another embodiment, the first tubes 14 are hollow.

Each of a pair of first rods 22, which are complementary to the first tubes 14, is positioned in and selectively extensible from the first end 18 of a respective first tube 14. A front 24 of the base 12 is selectively positionable relative to the second ends 20 of the first tubes 14.

A post 26 is coupled to and extends perpendicularly from the base 12. The post 26 comprises a plurality of nested sections 28. The post 26 is selectively extensible. In one embodiment, the post 26 is substantially circularly shaped when viewed longitudinally. In another embodiment, the plurality of nested sections 28 comprises an upper section 30 and a lower section 32.

A first coupler 34 is coupled to the lower section 32 distal from the base 12. A second coupler 36 is coupled to the upper section 30. The second coupler 36 is complementary to the first coupler 34. The second coupler 36 is positioned to couple to the first coupler 34 to selectively couple the upper section 30 to the lower section 32. In one embodiment, the second coupler 36 comprises a pin 38. The pin 38 is spring-loaded. The first coupler 34 comprises a plurality of penetrations 40 that is arrayed longitudinally in the lower section 32. Each penetration 40 is positioned to selectively insert the pin 38 to couple the upper section 30 to the lower section 32.

A line guide 42 is coupled to the front 24 of the base 12. The line guide 42 is configured to direct a swing of a putter that is positioned in hands of a user. In one embodiment, the line guide 42 comprises a string 44 that is coupled to and extends between the first rods 22. The string 44 is positioned distal from the first ends 18 of the first tubes 14. In another embodiment of the invention, the line guide 42 comprises a laser 46 that is coupled to a respective first rod 22. The laser 46 is positioned distal from the first end 18 of the respective first tube 14. The laser 46 is positioned to lase between the first rods 22 so that the user is provided a visual aid to direct the putting stroke.

A frame 48 is coupled to the post 26 distal from the base 12. The frame 48 extends from the post 26 toward the front 24 of the base 12. The frame 48 is open-bottomed. The frame 48 is configured to bracket both shoulders of the user who is positioned between the post 26 and the front 24 of the base 12. The frame 48 is configured to contact a torso of the user to notify the user of an improper putting stroke.

In one embodiment, the frame 48 comprises a second rod 50 that is coupled to and extends from the post 26. A ring 52 is coupled to the second rod 50 distal from the post 26. The ring 52 is substantially rectangularly shaped. The ring 52 is hollow and defines an internal space 54. In one embodiment, each side 56 of the ring 52 comprises a pair of third tubes 58 and a fourth tube 60. Each pair of third tubes 58 is positioned in and selectively divergently extensible from an associated fourth tube 60 so that the ring 52 is selectively sizable.

Each of a set of four slats 62 is coupled to the ring 52 proximate to a respective corner 64 of the ring 52. The slats 62 extend toward the base 12. The slats 62 are configured to contact the torso of the user to notify the user of the improper putting stroke. In one embodiment, the slats 62 are hand shaped distal from the ring 52.

A power module 66 and a microprocessor 68 are coupled to the ring 52 and are positioned in the internal space 54. The power module 66 comprises at least one battery 70. The microprocessor 68 is operationally coupled to the power module 66. A speaker 72 is coupled to the ring 52 and is operationally coupled to the microprocessor 68. Each of a plurality of sensors 74 is coupled to a respective slat 62 distal from the ring 52. The sensors 74 are touch activated. The sensors 74 are operationally coupled to the microprocessor 68. The sensors 74 are configured to detect contact of the torso of the user with a respective slat 62. The microprocessor 68 is positioned to compel the speaker 72 to audibly notify the user of the improper putting stroke.

In use, the line guide 42 configured to direct the swing of the putter that is positioned in the hands of the user. The sensors 74 are configured to detect contact of the torso of the user with the respective slat 62. The microprocessor 68 is positioned to compel the speaker 72 to audibly notify the user of the improper putting stroke.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A golf putting training device comprising:
   a base configured for positioning on a substantially horizontal surface, said base comprising a pair of first tubes and a second tube, said second tube being coupled to and extending perpendicularly between said first tubes, said second tube being positioned substantially equally distant from a first end and a second end of each said first tube;
   a post coupled to and extending perpendicularly from said base, said post comprising a plurality of nested sections such that said post is selectively extensible;
   a line guide coupled to a front of said base;
   a frame coupled to said post distal from said base, said frame extending from said post toward said front of said base, said frame being open-bottomed such that said frame is configured for bracketing both shoulders of a user positioned between said post and said front of said base; and
   wherein said line guide is positioned on said base such that said line guide is configured for directing a swing of a putter positioned in hands of the user, wherein said frame is positioned on said post such that said frame is configured for contacting a torso of the user for notifying the user of an improper putting stroke.

2. The device of claim 1, further including said first tubes and said second tube being substantially circularly shaped when viewed longitudinally.

3. The device of claim 1, further comprising:
   said first tubes being hollow;
   a pair of first rods, said first rods being complementary to said first tubes, each said first rod being positioned in and selectively extensible from said first end of a respective said first tube; and
   wherein said front of said base is selectively positionable relative to said second ends of said first tubes.

4. The device of claim 3, further including said line guide comprising a string coupled to and extending between said first rods, said string being positioned distal from said first ends of said first tubes.

5. The device of claim 3, further including said line guide comprising a laser coupled to a respective said first rod, said laser being positioned distal from said first end of said respective said first tube, wherein said laser is positioned is said respective said first rod such that said laser is positioned for lasing between said first rods, such that the user is provided a visual aid for directing the putting stroke.

6. The device of claim 1, further including said post being substantially circularly shaped when viewed longitudinally.

7. The device of claim 1, further including said plurality of nested sections comprising an upper section and a lower section.

8. The device of claim 7, further comprising:
   a first coupler coupled to said lower section distal from said base;

a second coupler coupled to said upper section, said second coupler being complementary to said first coupler; and wherein said second coupler is positioned on said upper section such that said second coupler is positioned for coupling to said first coupler for selectively coupling said upper section to said lower section.

9. The device of claim 8, further comprising:

said second coupler comprising a pin, said pin being spring-loaded;

said first coupler comprising a plurality of penetrations arrayed longitudinally in said lower section; and wherein each said penetration is positioned for selectively inserting said pin to couple said upper section to said lower section.

10. A golf putting training device comprising:

a base configured for positioning on a substantially horizontal surface;

a post coupled to and extending perpendicularly from said base, said post comprising a plurality of nested sections such that said post is selectively extensible;

a line guide coupled to a front of said base;

a frame coupled to said post distal from said base, said frame extending from said post toward said front of said base, said frame being open-bottomed such that said frame is configured for bracketing both shoulders of a user positioned between said post and said front of said base;

wherein said line guide is positioned on said base such that said line guide is configured for directing a swing of a putter positioned in hands of the user, wherein said frame is positioned on said post such that said frame is configured for contacting a torso of the user for notifying the user of an improper putting stroke; and said frame comprising
  a second rod coupled to and extending from said post;
  a ring coupled to said second rod distal from said post, said ring being substantially rectangularly shaped;
  a set of four slats, each said slat being coupled to said ring proximate to a respective corner of said ring, said slats extending toward said base; and
  wherein said slats are positioned on said ring such that said slats are configured for contacting the torso of the user for notifying the user of the improper putting stroke.

11. The device of claim 10, further including each said side of said ring comprising a pair of third tubes and a fourth tube, each said pair of third tubes being positioned in and selectively divergently extensible from an associated said fourth tube such that said ring is selectively sizable.

12. The device of claim 10, further including said slats being hand shaped distal from said ring.

13. The device of claim 10, further comprising:

said ring being hollow such that said ring defines an internal space;

a power module coupled to said ring and positioned in said internal space, said power module comprising at least one battery;

a microprocessor coupled to said ring and positioned in said internal space, said microprocessor being operationally coupled to said power module;

a speaker coupled to said ring, said speaker being operationally coupled to said microprocessor;

a plurality of sensors, each said sensor being coupled to a respective said slat distal from said ring, said sensors being touch activated, said sensors being operationally coupled to said microprocessor; and wherein said sensors are positioned on said slats such that said sensors are configured for detecting contact of the torso of the user with a respective said slat, such that said microprocessor is positioned for compelling said speaker to audibly notify the user of the improper putting stroke.

14. A golf putting training device comprising:

a base configured for positioning on a substantially horizontal surface, said base comprising a pair of first tubes and a second tube, said second tube being coupled to and extending perpendicularly between said first tubes, said second tube being positioned substantially equally distant from a first end and a second end of each said first tube, said first tubes and said second tube being substantially circularly shaped when viewed longitudinally, said first tubes being hollow;

a pair of first rods, said first rods being complementary to said first tubes, each said first rod being positioned in and selectively extensible from said first end of a respective said first tube such that a front of said base is selectively positionable relative to said second ends of said first tubes;

a post coupled to and extending perpendicularly from said base, said post comprising a plurality of nested sections such that said post is selectively extensible, said post being substantially circularly shaped when viewed longitudinally, said plurality of nested sections comprising an upper section and a lower section;

a first coupler coupled to said lower section distal from said base;

a second coupler coupled to said upper section, said second coupler being complementary to said first coupler, wherein said second coupler is positioned on said upper section such that said second coupler is positioned for coupling to said first coupler for selectively coupling said upper section to said lower section, said second coupler comprising a pin, said pin being spring-loaded, said first coupler comprising a plurality of penetrations arrayed longitudinally in said lower section, wherein each said penetration is positioned for selectively inserting said pin to couple said upper section to said lower section;

a line guide coupled to said front of said base, wherein said line guide is positioned on said base such that said line guide is configured for directing a swing of a putter positioned in hands of a user, said line guide comprising a string coupled to and extending between said first rods, said string being positioned distal from said first ends of said first tubes;

a frame coupled to said post distal from said base, said frame extending from said post toward said front of said base, said frame being open-bottomed such that said frame is configured for bracketing both shoulders of the user positioned between said post and said front of said base, wherein said frame is positioned on said post such that said frame is configured for contacting a torso of the user for notifying the user of an improper putting stroke, said frame comprising:
  a second rod coupled to and extending from said post,
  a ring coupled to said second rod distal from said post, said ring being substantially rectangularly shaped, said ring being hollow such that said ring defines an internal space, each said side of said ring comprising a pair of third tubes and a fourth tube, each said pair of third tubes being positioned in and selectively divergently extensible from an associated said fourth tube such that said ring is selectively sizable, and a set of four slats, each said slat being coupled to said ring proximate to a respective corner of said ring, said slats extending toward said base, wherein said slats are positioned on said ring such that said slats are configured for contacting the torso of the user for notifying the user of the improper putting stroke, said slats being hand shaped distal from said ring;

a power module coupled to said ring and positioned in said internal space, said power module comprising at least one battery;

a microprocessor coupled to said ring and positioned in said internal space, said microprocessor speaker being operationally coupled to said power module;

a speaker coupled to said ring, said speaker being operationally coupled to said microprocessor;

a plurality of sensors, each said sensor being coupled to a respective said slat distal from said ring, said sensors being touch activated, said sensors being operationally coupled to said microprocessor, wherein said sensors are positioned on said slats such that said sensors are configured for detecting contact of the torso of the user with a respective said slat, such that said microprocessor is positioned for compelling said speaker to audibly notify the user of the improper putting stroke; and wherein said line guide is positioned on said base such that said line guide is configured for directing a swing of a putter positioned in hands of the user, wherein said sensors are positioned on said slats such that said sensors are configured for detecting contact of the torso of the user with a respective said slat, such that said microprocessor is positioned for compelling said speaker to audibly notify the user of the improper putting stroke.

15. The device of claim 14, further including said line guide comprising a laser coupled to a respective said first rod, said laser being positioned distal from said first end of said respective said first tube, wherein said laser is positioned is said respective said first rod such that said laser is positioned for lasing between said first rods, such that the user is provided a visual aid for directing the putting stroke.

* * * * *